United States Patent

Yamamoto et al.

(10) Patent No.: US 9,173,408 B2
(45) Date of Patent: Nov. 3, 2015

(54) HEATING COOKER

(75) Inventors: Yoshikazu Yamamoto, Kadoma (JP);
Yoshikazu Kitaguchi, Habikino (JP);
Tatsuhiko Nakamura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 2319 days.

(21) Appl. No.: 11/996,737

(22) PCT Filed: Jul. 20, 2006

(86) PCT No.: PCT/JP2006/314389
§ 371 (c)(1),
(2), (4) Date: Jan. 24, 2008

(87) PCT Pub. No.: WO2007/013347
PCT Pub. Date: Feb. 1, 2007

(65) Prior Publication Data
US 2010/0126356 A1 May 27, 2010

(30) Foreign Application Priority Data

Jul. 26, 2005 (JP) ................................. 2005-215305

(51) Int. Cl.
*A47J 36/00* (2006.01)
*A21B 3/04* (2006.01)

(52) U.S. Cl.
CPC ........................................ *A21B 3/04* (2013.01)

(58) Field of Classification Search
CPC .............. A21B 3/04; A21B 1/24; A21B 7/00;
A21B 1/48; A23B 4/0053; A23B 4/005;
A23B 5/005; A23L 3/001; A23L 3/003;
A23L 3/02; A23L 3/04; A23L 3/06; A23L
3/18; A23L 3/3418; A23L 1/0121; A61L
2202/14; A23V 2002/00
USPC ......... 99/330, 331, 337, 467; 126/369, 369.1;
219/401, 682
See application file for complete search history.

(56) References Cited

U.S. PATENT DOCUMENTS

| 4,253,385 | A | * | 3/1981 | Illy ................................. 99/281 |
| 4,773,008 | A | * | 9/1988 | Schroeder et al. ............... 700/90 |
| 4,968,516 | A | * | 11/1990 | Thompson ..................... 426/233 |
| 5,372,061 | A | * | 12/1994 | Albert et al. .................... 99/281 |
| 5,631,033 | A | * | 5/1997 | Kolvites ........................ 426/233 |

(Continued)

FOREIGN PATENT DOCUMENTS

| JP | 60-6904 U | 1/1985 |
| JP | 2001-269268 A | 10/2001 |

(Continued)

*Primary Examiner* — Eric Stapleton
(74) *Attorney, Agent, or Firm* — Birch, Stewart, Kolasch & Birch, LLP

(57) ABSTRACT

A water level sensor (91) is provided in an auxiliary tank (39) whose bottom portion communicates to a bottom portion of a pot (41) for generating steam and which is opened to the atmosphere. When water in the pot (41) keeps boiling and the stop time of a pump (35) reaches a predetermined time (e.g., 60 sec.), the pump (35) is driven for a predetermined time (e.g., 6 sec.) to supply water to the pot (41). This temporarily suppresses the boiling of water in the pot (41), lowering a steam pressure in a space formed by an external circulation passage (60), a heating chamber, and the pot (41). The water level in the auxiliary tank (39) then returns to a normal one, making it possible to correctly detect the water level in the pot (41).

4 Claims, 5 Drawing Sheets

(56) References Cited

U.S. PATENT DOCUMENTS

| | | | |
|---|---|---|---|
| 6,232,587 B1 * | 5/2001 | Kurita et al. | 219/682 |
| 6,323,464 B1 * | 11/2001 | Cohn | 219/401 |
| 7,208,702 B2 * | 4/2007 | Choi | 219/401 |
| 2005/0056634 A1 * | 3/2005 | Shozo | 219/401 |
| 2006/0291828 A1 * | 12/2006 | Kadoma et al. | 392/404 |

FOREIGN PATENT DOCUMENTS

| | | |
|---|---|---|
| JP | 2005-42983 A | 2/2005 |
| JP | 2005-83708 A | 3/2005 |
| JP | 2005-195250 A | 7/2005 |

* cited by examiner

HEATING COOKER

BACKGROUND OF THE INVENTION

The present invention relates to a heating cooker for heat-cooking foods by using steam.

Heretofore, as a heating cooker for heat-cooking an object to be cooked such as food by using steam, there is a heating cooker with a steam generator disclosed in JP 4-123790 A (reference 1). The heating cooker with a steam generator includes a heating chamber, an induction heating coil, a tank, a water reservoir and an opening/closing valve. Then, with vaporization water fed to the water reservoir, the opening/closing valve is opened to fill the tank with water, and the induction heating coil is turned on with an alternating current so that the tank is heated by an alternating magnetic field generated in the coil to generate steam. The generated steam is sent into the heating chamber, thus allowing the heat cooking to be carried out.

However, the heating cooker with a steam generator disclosed in the above reference 1 involves manpower for supply of water to the water reservoir. The opening/closing valve is to be operated also by hand. Due to this, even if the tank is emptied, the heating chamber is continued to be heated, accompanied by a risk of overheating damage, catching fire or the like. Further, since the tank is fixed, there is an inconvenience that the water supply has to be done by using a water container for water-carrying use.

Accordingly, in order to solve the risk and the inconvenience, it is conceivable to provide an auxiliary tank which has a bottom portion communicated with a bottom portion of the fixed tank while having an upper end opened, and in which a water level sensor is set up, the water level sensor functioning to detect a water level within the tank. In this case, since the water in the auxiliary tank goes up until its water level becomes flush with that of the fixed tank, the water level in the fixed tank can be detected by detecting the water level in the auxiliary tank by means of the water level sensor. This water level detection method is often used because it requires no setting of the water level sensor on the fixed tank side, which is to be directly heated, so that the water level in the fixed tank can be detected conveniently.

In the case where the water level in the tank for generating steam is detected by the water level sensor of the auxiliary tank, unfortunately, there is a problem as shown below. That is, since the fixed tank is closed, continued heating of the heating chamber causes the generated steam to become increasingly filled in the tank and the heating chamber, which in turn causes pressures in the tank and the heating chamber to increase due to the difference in volume between water and steam, the latter being larger. Then, the water surface in the tank is pressed by the increased pressure, causing the water in the auxiliary tank to be forced up with its water level no longer lowered. Meanwhile, the water in the fixed tank, which evaporates, continues to decrease.

Therefore, the water level in the fixed tank and the water level in the auxiliary tank differs from each other, giving rise to cases in which the auxiliary tank is not emptied even when the fixed tank is substantially emptied, so that the water level sensor outputs a normal value. In this case, because the water level sensor outputs a normal value, the fixed tank is not supplied with water, accompanied by a risk of heating without water.

SUMMARY OF THE INVENTION

Accordingly, an object of the present invention is to provide a heating cooker in which a water level within a pot that serves for generating steam can be detected correctly at all times.

In order to solve the problem, the present invention provides a heating cooker, comprising:

a steam generator for generating steam;

a heating chamber for heating an object to be cooked by steam supplied from the steam generator, said steam generator including a pot to which water is supplied, a heater placed in the pot, and a water temperature sensor placed in vicinity of an upper side of the heater for outputting a temperature signal that represents a detected temperature, the heating cooker further comprising:

an auxiliary tank communicating to a bottom portion of the pot and being open to the atmosphere to form a liquid column having a water level equal to a water level of the pot;

a water level sensor provided in the auxiliary tank for detecting the water level in the auxiliary tank;

a pump for supplying water to the pot; and a water supply control section for, based on a temperature signal derived from the water temperature sensor, detecting a state that the water in the pot is boiling, and, when the boiling state has continued for a predetermined time, controlling the pump to supply to the pot an amount of water necessary to suppress the boiling state.

With the above construction, when the water in the pot has kept boiling for a predetermined time, the pump is controlled by the water supply control section so that an amount of water necessary to suppress the boiling is supplied to the pot. Accordingly, in the case where the steam pressure in the closed space ranging from the pot to the heating chamber increases, causing the water in the auxiliary tank to be forced up, so that the water level in the pot and the water level in the auxiliary tank are different from each other, the water boiling in the pot is temporarily suppressed and the steam pressure in the closed space is lowered, with the result that the water level in the auxiliary tank returns to a normal one. Thus, it becomes possible to correctly detect the water level in the pot by detecting the water level in the auxiliary tank.

Consequently, the water level in the pot can be detected correctly at all times.

In one embodiment, when a state that the water in the pot is boiling while the pump is at a stop has continued for the predetermined time, the water supply control section controls the pump to supply to the pot an amount of water necessary to suppress the boiling.

According to this embodiment, when the pump-stopped state has continued for the predetermined time in addition to the boiling state, water is supplied to the pot. Therefore, it becomes possible to supply water to the pot at a timing when the steam pressure in the space of the pot to the heating chamber increases, causing the water in the auxiliary tank to be forced up, so that the water level in the pot and the water level in the auxiliary tank are different from each other.

As is apparent from the above description, in the heating cooker of this invention, when the water in the pot has kept boiling for a predetermined time, the pump is controlled by the water supply control section so that an amount of water necessary to suppress the boiling is supplied to the pot. Therefore, in the case where the steam pressure in the closed space ranging from the pot to the heating chamber increases so that the water in the auxiliary tank communicating with the bottom portion of the pot is forced up, causing the result that the water level in the pot and the water level in the auxiliary tank to be different from each other, the water boiling in the pot is temporarily suppressed and the steam pressure in the closed space is lowered, with the result that the water level in the auxiliary tank returns to a normal one. Thus, by detecting the water level in the auxiliary tank by means of the water level sensor from this on, the water level in the pot can correctly be detected.

Consequently, according to this invention, the water level in the pot can be detected correctly at all times.

DETAILED DESCRIPTION OF THE INVENTION

Figure 1:
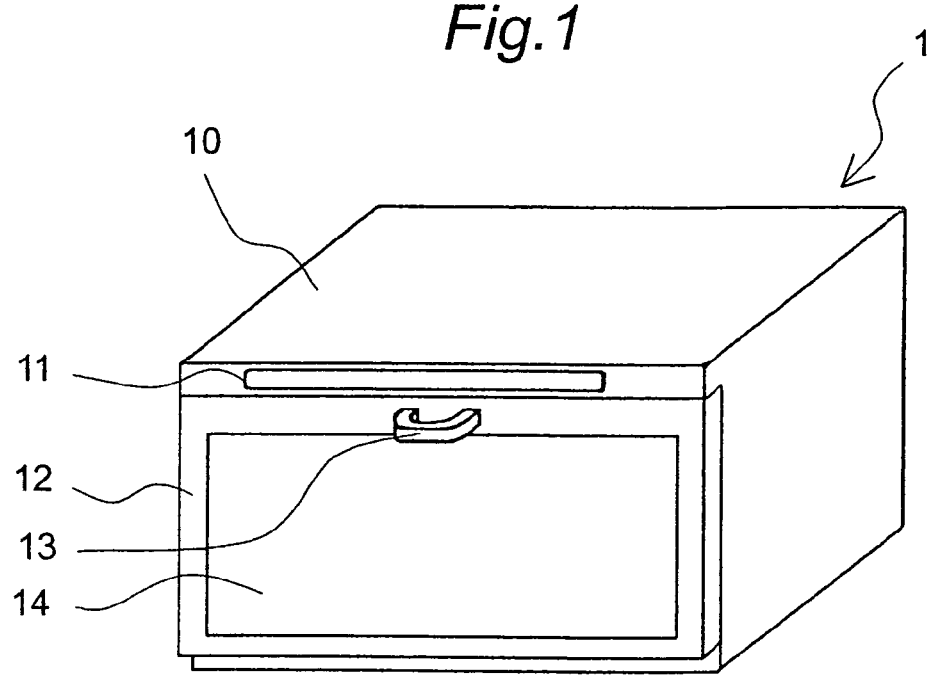
FIG. 1 is a perspective view showing an external appearance of a heating cooker according to the invention.

The heating cooker of the invention will be described using examples shown in the drawings.

FIG. 1 is an external perspective view of a heating cooker 1 according to the present embodiment of the invention. The heating cooker 1 is schematically constructed as follows. A front upper portion of a rectangular parallelepiped cabinet 10 is provided with an operation panel 11, and a door 12, which is rotatable around a lower end side of the cabinet, is provided under the operation panel 11. An upper portion of the door 12 is provided with a handle 13, and the door 12 is provided with a window 14 made of thermal glass.

Figure 2:
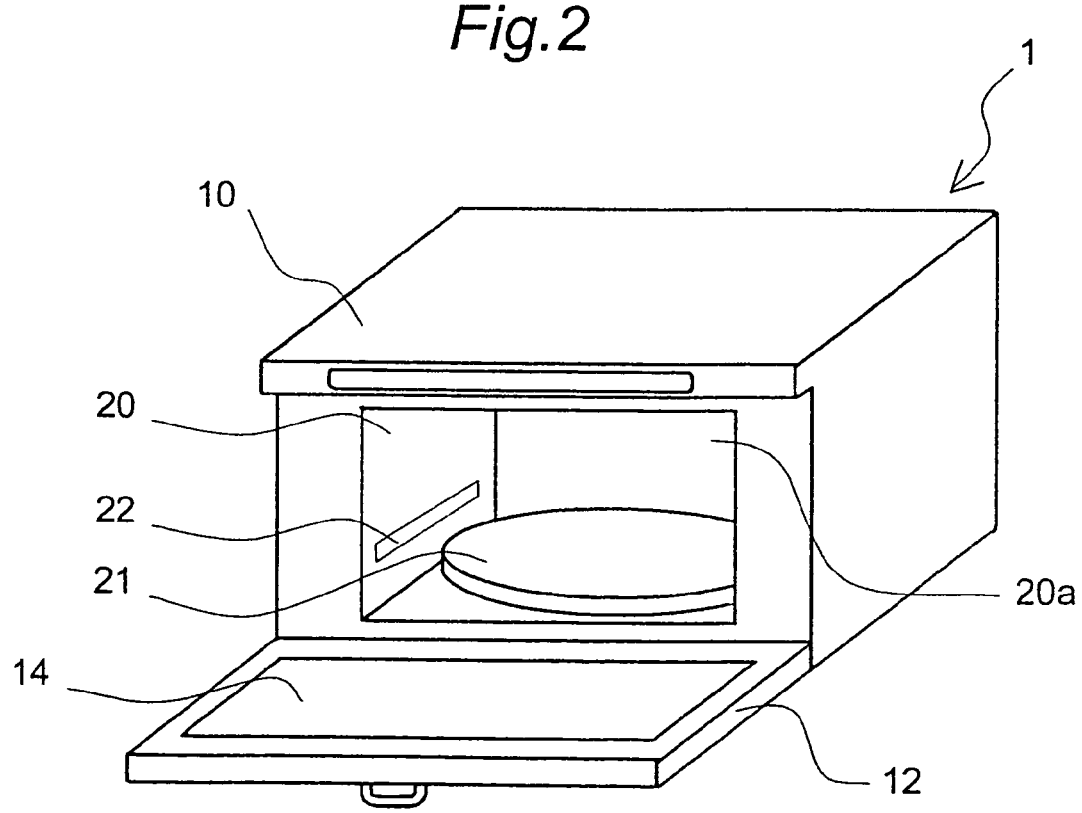
FIG. 2 is a perspective view showing an external appearance of the heating cooker shown in FIG. 1 with its door opened.

FIG. 2 is an external perspective view of the heating cooker 1 with the door 12 opened. A rectangular parallelepiped heating chamber 20 is provided in the cabinet 10. The heating chamber 20 has an opening 20a on its front side facing the door 12, and side walls, a bottom surface and a ceiling of the heating chamber 20 are formed of stainless steel plates. A side of the door 12 facing the heating chamber 20 is formed of a stainless steel plate. A heat insulator (not shown) is placed in the surrounding of the heating chamber 20 and the interior of the door 12 to insulate the inside of the heating chamber 20 from the outside.

A stainless steel-made catch pan 21 is placed at the bottom surface of the heating chamber 20, and a stainless steel wire-made rack 24 (see FIG. 3) for receiving an object to be cooked is placed on the catch pan 21. Further, side steam outlets 22 of a roughly rectangular shape, which are extending roughly horizontally (only one of the outlets is seen in FIG. 2), are provided at both lower lateral sides of the heating chamber 20.

Figure 3:
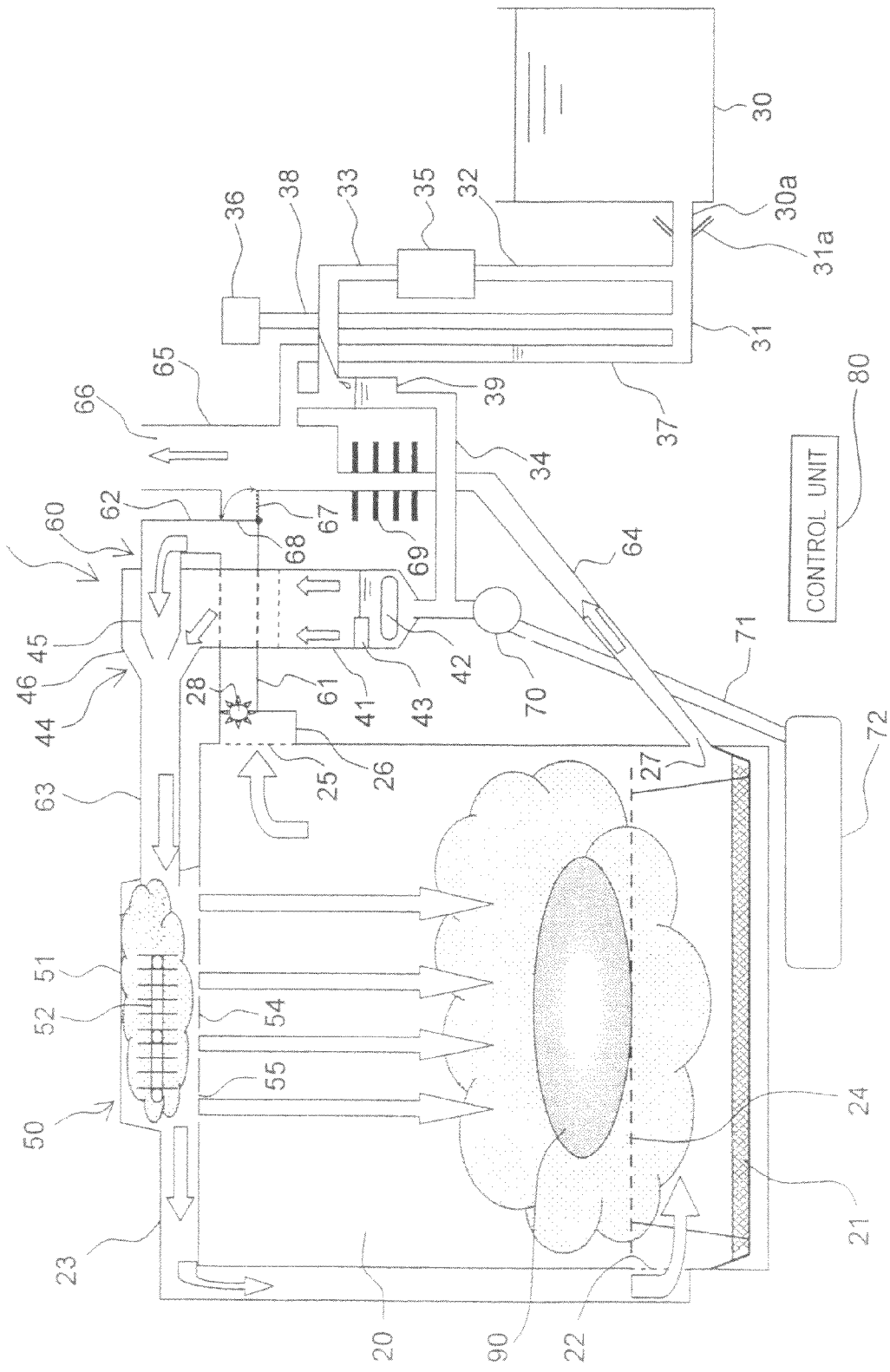
FIG. 3 is a schematic diagram showing the construction of the heating cooker shown in FIG. 1.

FIG. 3 is a schematic view showing the basic construction of the heating cooker 1. As shown in FIG. 3, the heating cooker 1 includes the heating chamber 20, a water tank 30 for storing water for steam, a steam generator 40 for evaporating water supplied from the water tank 30, a steam temperature-raising device 50 for heating steam from the steam generator 40, and a control unit 80 for controlling operation of the steam generator 40, the steam temperature-raising device 50 and other devices.

The lattice-like rack 24 is placed on the catch pan 21 placed in the heating chamber 20, and an object 90 to be cooked is placed at a central portion of the rack 24.

A connecting portion 30a provided at the lower side of the water tank 30 is connectable to a funnel-like receiving port 31a provided at one end of a first water supply pipe 31. The suction side of a pump 35 is connected to an end of a second water supply pipe 32, which branches off from the first water supply pipe 31 and extends upward, and one end of a third water supply pipe 33 is connected to the discharge side of the pump 35. A water level sensor 36 for the water tank is provided at an upper end portion of a pipe 38 for the water level sensor, which pipe branches off from the first water supply pipe 31 and extends upward. Further, an upper end portion of an air releasing pipe 37 that branches off from the first water supply pipe 31 and extends upward is connected to an exhaust gas duct 65.

The third water supply pipe 33 has an L shape that is bent roughly horizontally from a vertically placed portion and an auxiliary tank 39 is connected to the other end of the third water supply pipe 33. One end of a fourth water supply pipe 34 is connected to a lower end of the auxiliary tank 39, and the other end of the fourth water supply pipe 34 is connected to a lower end of the steam generator 40. One end of a drain valve 70 is connected to the lower side from the fourth water supply pipe 34 in the steam generator 40. One end of a drain pipe 71 is connected to the other end of the drain valve 70, and a water drain tank 72 is connected to the other end of the drain pipe 71. An upper portion of the auxiliary tank 39 communicates with air via the air releasing pipe 37 and the exhaust gas duct 65.

Once the water tank 30 has been connected to the receiving port 31a of the first water supply pipe 31, water rises in the air releasing pipe 37 until its water level reaches the same water level as that of the water tank 30. Since a tip of the pipe 38 connected to the water level sensor 36 for the water tank is closed, the water level in the pipe 38 does not rise, but a pressure in a closed space in the pipe 38 for the water level sensor increases from an atmospheric pressure, depending on the water level of the water tank 30. This pressure change is detected by a pressure detection device (not shown) in the water level sensor 36 for the water tank, whereby the water level in the water tank 30 is detected. Although water level measurement does not require the air releasing pipe 37 while the pump 35 is stationary, the air releasing pipe 37 having an open end is used in order to prevent deterioration of accuracy in the detection of the water level due to direct application of a suction pressure of the pump 35 to the pressure detection device.

The steam generator 40 has a pot 41, to the lower side of which the other end of the fourth water supply pipe 34 is connected, a steam generator heater 42 placed in the vicinity of a bottom surface in the pot 41, a water level sensor 43 placed in the vicinity of the upper side of the steam generator heater 42 in the pot 41, and a steam suction ejector 44 attached to the upper side of the pot 41. A fan casing 26 is placed outside an intake opening 25 provided at an upper portion of a lateral side of the heating chamber 20. Steam in the heating chamber 20 is sucked through the intake opening 25 by a blower fan 28 placed in the fan casing 26. The sucked steam is sent to an inlet side of the steam suction ejector 44 via a first pipe 61 and a second pipe 62. The first pipe 61 is placed roughly horizontally, and its one end is connected to the fan casing 26. The second pipe 62 is roughly vertically placed, and its one end is connected to the other end of the first pipe 61, and the other end of the second pipe 62 is connected to the inlet side of an inner nozzle 45 of the steam suction ejector 44.

The steam suction ejector 44 has an outer nozzle 46 that covers an outer side of the inner nozzle 45, and the discharge side of the inner nozzle 45 communicates with an internal space of the pot 41. The discharge side of the outer nozzle 46 of the steam suction ejector 44 is connected to one end of a third pipe 63 and a steam temperature-raising device 50 is connected to the other end of the third pipe 63.

The fan casing 26, the first pipe 61, the second pipe 62, the steam suction ejector 44, the third pipe 63, and the steam temperature-raising device 50 form an external circulation passage 60. One end of a discharge passage 64 is connected to a discharge port 27 provided in a lower portion of the lateral side of the heating chamber 20, and the other end of the discharge passage 64 is connected to one end of the exhaust gas duct 65. The other end of the exhaust gas duct 65 is provided with an exhaust gas outlet 66. A radiator 69 is outwardly fitted to the exhaust gas duct 65 side of the discharge passage 64. A connection portion between the first pipe 61 and the second pipe 62 is connected to the exhaust gas duct 65 through an exhaust gas passage 67. At the connection with the first and second pipes 61, 62, the exhaust gas passage 67 is provided with a damper 68 that opens/closes the exhaust gas passage 67.

The steam temperature-raising device 50 includes a tray-shaped case 51 placed, with its opening downward, on a ceiling side at a central portion of the heating chamber 20, and a steam superheater 52 placed in the tray-shaped case 51. A bottom of the tray-shaped case 51 is formed of a metallic ceiling panel 54 serving as a ceiling plane of the heating chamber 20. The ceiling panel 54 is formed with a plurality of ceiling steam outlets 55. Both upper and lower surfaces of the ceiling panel 54 give a dark color by coating and the like. The ceiling panel 54 may also be formed of a metal material that turns into a dark color by repetitive use or a dark-color ceramic molded product.

One end of each of steam supply passages 23 (in FIG. 3, only one of them is shown) serving as the superheated steam supply passages, which extend to the left and right sides of the heating chamber 20, is individually connected to the steam temperature-raising device 50. The other end of each of the steam supply passages 23 extends downward along the respective side walls of the heating chamber 20 and is connected to respective side steam outlets 22, which are provided in a lower position of the lateral sides of the heating chamber 20.

Next, the control system of the heating cooker will be described.

Figure 4:
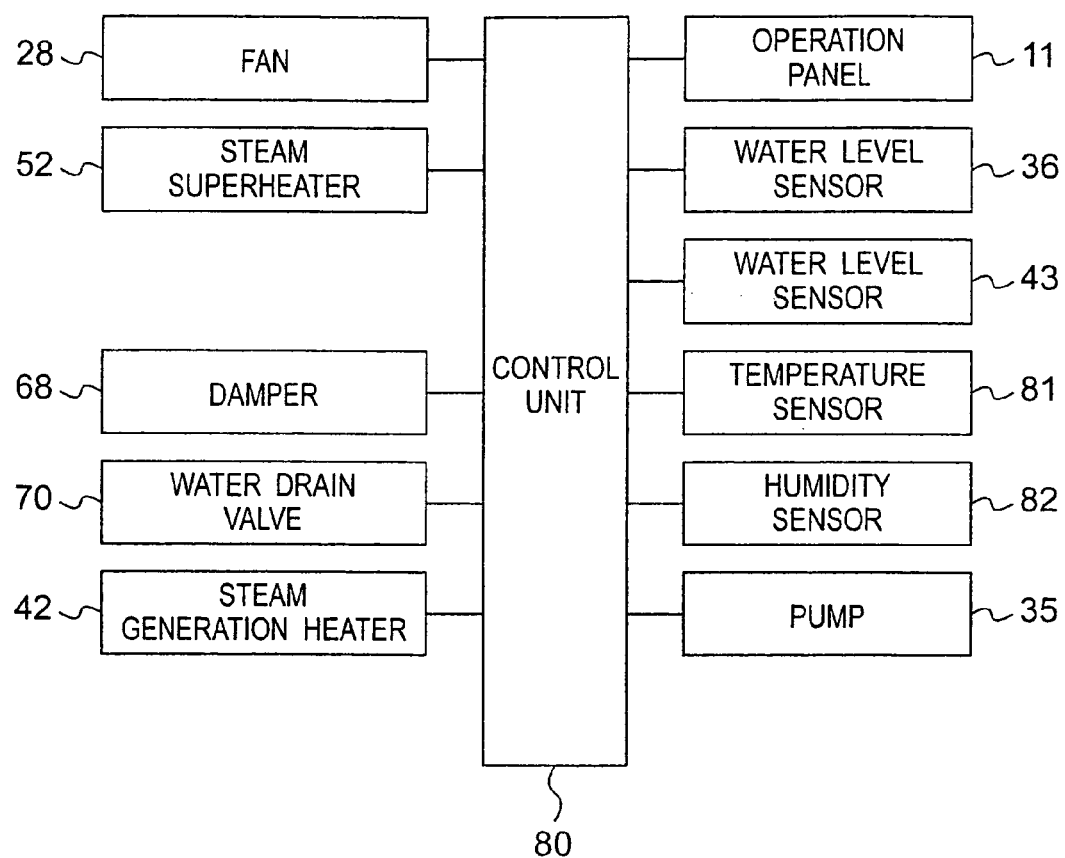
FIG. 4 is a control block diagram of the heating cooker shown in FIG. 1.

The control unit 80 is made up of a microcomputer and input/output circuits and the like, and has connections, as shown in FIG. 4, with the blower fan 28, the steam superheater 52, the damper 68, the drain valve 70, the steam generator heater 42, the operation panel 11, the water-tank water level sensor 36, the water level sensor 43, temperature sensor 81 for detecting a temperature in the heating chamber 20 (shown in FIG. 3), a humidity sensor 82 for detecting a humidity in the heating chamber 20, and the pump 35. Then, based on signals from the water-tank water level sensor 36, the water level sensor 43, the temperature sensor 81, and the humidity sensor 82, the control unit 80 controls the blower fan 28, the steam superheater 52, the damper 68, the drain valve 70, the steam generator heater 42, the operation panel 11, and the pump 35 according to specified programs.

Now, basic operation of the heating cooker 1 constructed as described above will be described below with reference to FIGS. 3 and 4. When a power switch (not shown) on the operation panel 11 is pressed, the power is turned on, and a cooking operation is started by operation of the operation panel 11. Then, the control unit 80 first closes the drain valve 70, and starts operation of the pump 35 with the exhaust gas passage 67 closed by the damper 68. By the pump 35, water is supplied from the water tank 30 into the pot 41 of the steam generator 40 via the first to fourth water supply pipes 31-34.

Thereafter, when it is detected by the water level sensor 43 that the water level in the pot 41 has reached a predetermined water level, the pump 35 is stopped to stop the water supply.

Next, the steam generator heater 42 is energized, and a predetermined amount of water accumulated in the pot 41 is heated by the steam generator heater 42.

Then, simultaneously with the energization of the steam generator heater 42 or at the time when the temperature of the water in the pot 41 reaches a predetermined temperature, the blower fan 28 is turned on and the steam superheater 52 of the steam temperature-raising device 50 is energized. Then, the blower fan 28 sucks in air (including steam) from the heating chamber 20 through the intake opening 25, blowing off the air (including steam) into the external circulation passage 60. In this case, since a centrifugal fan is used as the blower fan 28, higher pressures can be generated as compared with propeller fans. Further, rotating the centrifugal fan used as the blower fan 28 by a DC motor at high speed makes it possible to greatly enhance the flow velocity of the circulating air flow.

Next, when the water in the pot 41 of the steam generator 40 boils, saturated steam is generated, and the generated saturated steam is merged at the steam suction ejector 44 with the circulating air flow passing through the external circulation passage 60. The steam going out from the steam suction ejector 44 flows at high speed into the steam temperature-raising device 50 via the third pipe 63.

Then, the steam flowing into the steam temperature-raising device 50 is heated by the steam superheater 52 so as to be superheated steam of roughly 300° C. (which differs depending on contents of the cooking). A part of the superheated steam is jetted out downward in the heating chamber 20 through the plurality of ceiling steam outlets 55 provided in the lower ceiling panel 54. Another part of the superheated steam is jetted out through the side steam outlets 22 in both side walls of the heating chamber 20 via the steam supply passages 23 provided on both right and left sides of the steam temperature-raising device 50.

Thus, the superheated steam jetted out from the ceiling side of the heating chamber 20 is powerfully fed toward the center-positioned object 90 to be cooked, while the superheated steam jetted out from both the right and left sides of the heating chamber 20 is fed in such a way as to collide with the catch pan 21 and then go up from below the object 90 to wrap around the object 90. As a result, in the heating chamber 20, there occurs a convective flow of steam that blows down in a central part of the heating chamber and rises outside of the central part. Then, the convective steam flows are sucked into the intake opening 25 one after another, passing through the external circulation passage 60 and returning into the heating chamber 20 again, iteratively in circulation.

In this way, by forming a convective superheated steam flow in the heating chamber 20, it becomes possible to maintain uniform temperature and humidity distributions in the heating chamber 20 and, at the same time, to jet out superheated steam, which is derived from the steam temperature-raising device 50, from the ceiling steam outlets 55 and the side steam outlets 22 so that the steam efficiently collides with the object 90 placed on the rack 24. Thus, the object 90 is heated by the collisions of superheated steam. In this case, superheated steam in contact with a surface of the object 90 heats the object 90 also by releasing latent heat that is generated when building up condensation on the surface of the object 90. Thus, a large quantity of heat of the superheated steam can uniformly be imparted to the entire surface of the object 90 surely and promptly. Therefore, uniform cooking that secures a good finish is realized.

In the above cooking operation, the amount of steam in the heating chamber 20 increases with a lapse of time, and an excess amount of steam is discharged outside from the exhaust gas outlet 66 via the exhaust gas outlet 27, the discharge passage 64 and the exhaust gas duct 65. At this time, a radiator 69 provided on the discharge passage 64 cools steam passing the discharge passage 64 to form condensation, by which steam is prevented from being discharged to the outside as such. Water condensed by the radiator 69 within the discharge passage 64 runs down the discharge passage 64, is led to the catch pan 21, and disposed of together with water generated by cooking after completion of the cooking.

After completion of the cooking, the control unit 80 displays a message of completion of the cooking on the operation panel 11, and a sound is raised by a buzzer (not shown) provided on the operation panel 11. Having been noticed of the completion of the cooking by the message and buzzer, a user opens the door 12. Then, the control unit 80, detecting the opening of the door 12 by means of a sensor (not shown), instantaneously opens the damper 68 of the exhaust gas passage 67. Thus, the first pipe 61 of the external circulation passage 60 communicates with the exhaust gas duct 65 via the exhaust gas passage 67, so that steam in the heating chamber 20 is discharged by the blower fan 28 from the exhaust gas outlet 66 via the intake opening 25, the first pipe 61, the exhaust gas passage 67 and the exhaust gas duct 65. The operation of the damper is the same even if the user opens the door 12 while cooking. Therefore, the user can safely take out the object 90 from the inside of the heating chamber 20 without being exposed to steam.

In the basic construction of the heating cooker 1 shown in FIG. 3, that the water level in the pot 41 has come to a vicinity of the steam generator heater 42 is detected by the water level sensor 43 placed in the vicinity of the upper side of the steam generator heater 42 in the pot 41. However, when the water level sensor 43 is fitted to the pot 41 that is to be directly heated as in this case, there is the need to take into consideration the heat resistance of the water level sensor 43, the deposition of scale onto the water level sensor 43, and the like, which would make it hard to attain an easy and correct detection of the water level in the pot 41

Now, a water level detection method which allows the water level in the pot 41 to be easily and correctly detected will be described below.

Figure 5:
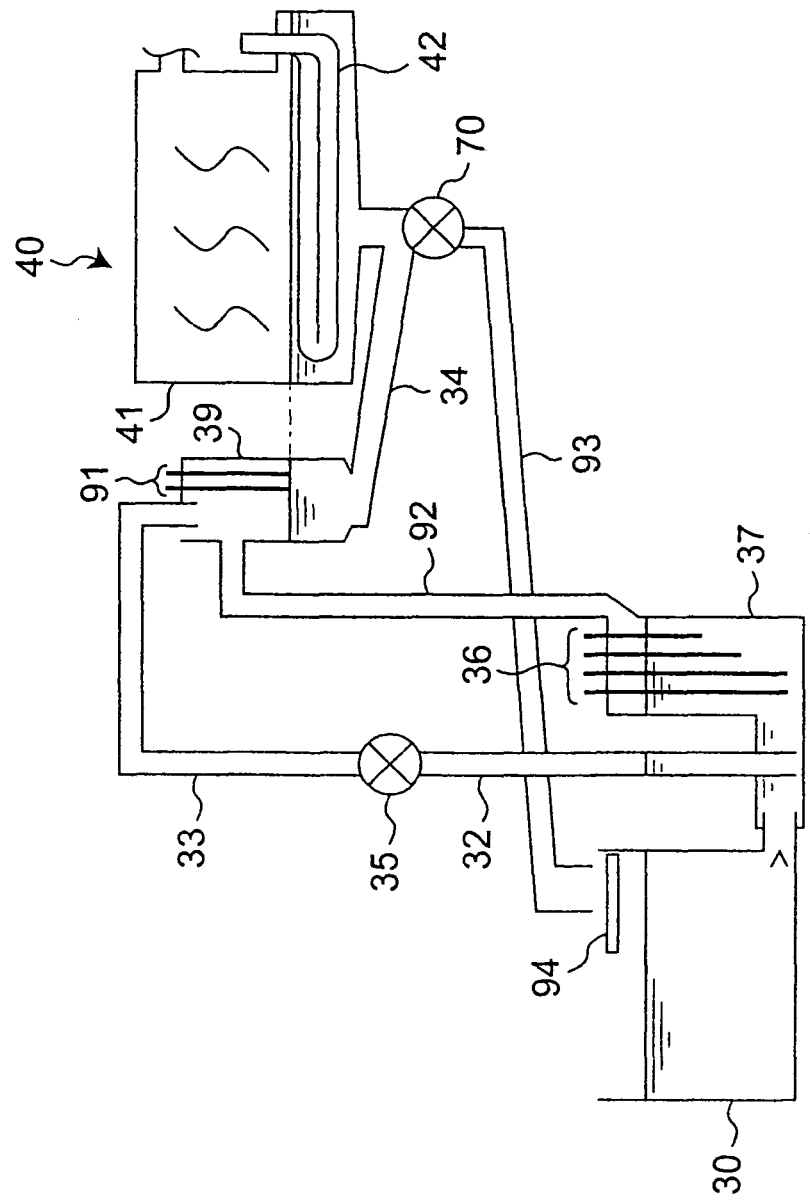
FIG. 5 shows a water level detection device.

FIG. 5 shows a water level detection device capable of easily and correctly detecting the water level in the pot 41 as mentioned above. Its differences from the basic construction shown in FIG. 3 are as follows. A water level sensor 91 is provided in the auxiliary tank 39, which is communicated with a bottom portion of the pot 41 by the fourth water supply pipe 34 and which is opened to the atmosphere. There is also provided an overflow tube 92 for returning water, which has overflowed from the auxiliary tank 39, to an air-opening pipe 37. Further, water discharged from the pot 41 through the drain valve 70 is returned to the water tank 30 via a filter 94 by a bypass pipe 93.

In this case, the water level sensor 91, which is provided in the auxiliary tank 39 that is not directly heated, does not need consideration of heat resistance or deposition of scale or the like, and is used in a space opened to the atmosphere, thus involving no limitations to the water level detection method and allowing a water level detection method to be selected from among a wider range of choices. In addition, in this embodiment, the water level detection method for the water level sensor 91 is not particularly limited or referred to.

In the above construction, as the pump 35 is driven with the drain valve 70 closed, water is supplied from the water tank 30 into the auxiliary tank 39. Then, since the bottom portion of the auxiliary tank 39 is communicated with the bottom portion of the pot 41 via the fourth water supply pipe 34, water is supplied also into the pot 41 via the fourth water supply pipe 34, so that the water level within the pot 41 becomes flush with that of the auxiliary tank 39. Thus, the water level within the auxiliary tank 39 is detected by the water level sensor 91, by which the water level within the pot 41 is detected.

Now, in the case where the water level in the pot 41 is detected by the water level in the auxiliary tank 39, there occurs the following problem, which is a problem as discussed in the BACKGROUND OF THE INVENTION section. That is, a space formed by the external circulation passage 60 (which is formed by the fan casing 26, the first pipe 61, the second pipe 62, the steam suction ejector 44, the third pipe 63 and the steam temperature-raising device 50) as well as by the heating chamber 20 and pot 41 communicating with the external circulation passage 60 is closed. Therefore, as the supply of steam to the heating chamber 20 is continued so that the external circulation passage 60, the heating chamber 20 and the pot 41 are increasingly filled with steam, the pressure in the closed space increases. As a result, the water surface in the pot 41 is pressed by a high-pressure steam, causing the water in the auxiliary tank 39 to be forced up from the bottom side via the fourth water supply pipe 34, so that the water level in the auxiliary tank 39 does not lower. Meanwhile, the water in the pot 41, which evaporates, continues to decrease.

Therefore, the water level in the pot 41 and the water level in the auxiliary tank 39 differs from each other, in which case even if the water level in the pot 41 is lower than the position of the steam generator heater 42, the water level in the auxiliary tank 39 may be upper than the aforementioned position, so that the water level sensor 91 may output a normal value that involves no water supply.

In such a case, supplying a small amount of water to the boiling water in the pot 41, i.e., the boiling water in the auxiliary tank 39 allows the boiling in the pot 41 and the auxiliary tank 39 to be suppressed. In this way, the generation of steam is temporarily stopped, and the steam pressure in the closed space formed by the external circulation passage 60, the heating chamber 20 and the pot 41 is lowered, with the result that the water level in the auxiliary tank 39 returned to a normal one. Thus, the water level in the pot 41 can be detected correctly.

Therefore, in this embodiment, the aforementioned problem is solved by controlling the drive of the pump 35 under the control of the control unit 80.

Figure 6:
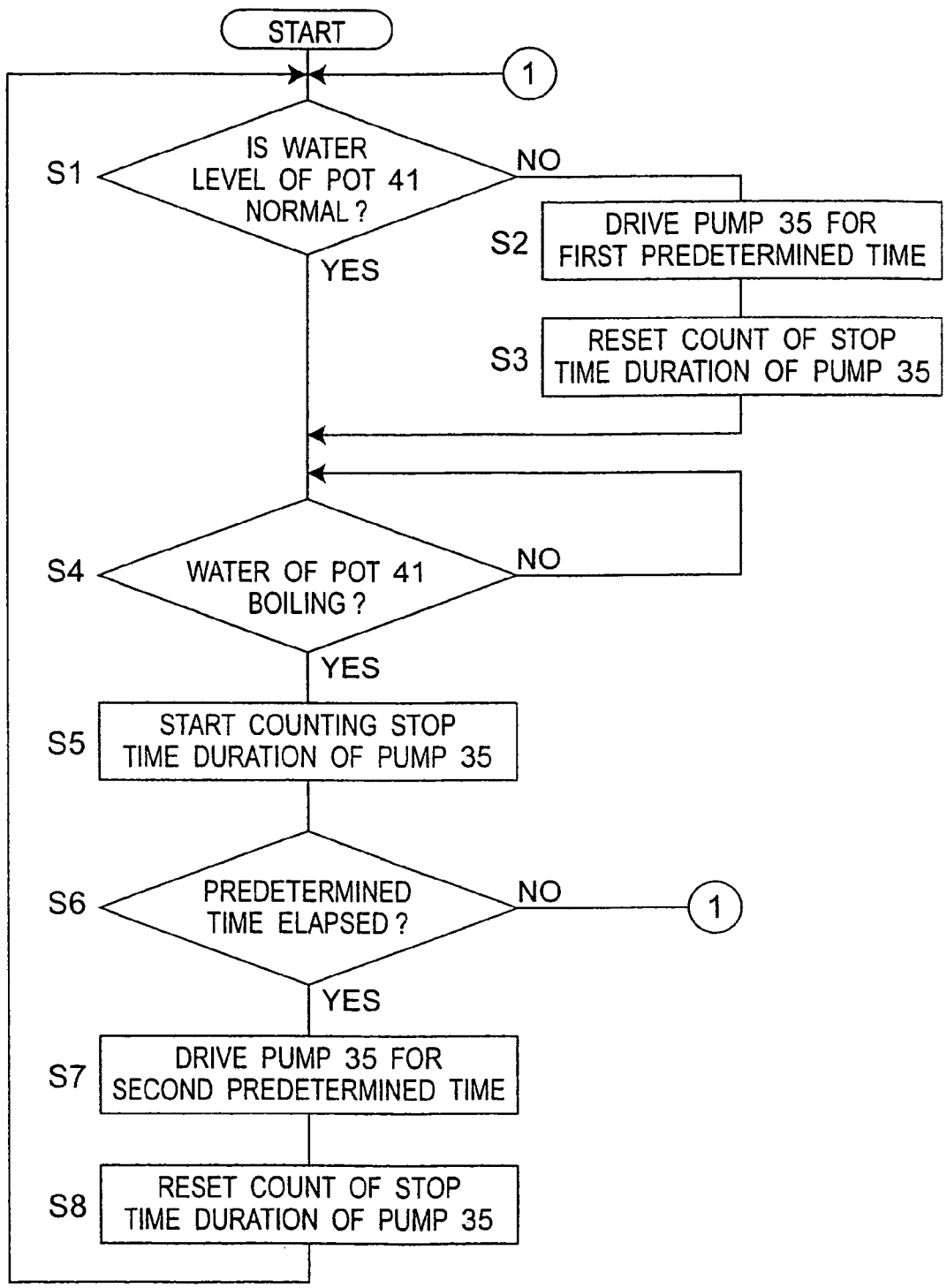
FIG. 6 is a flowchart of the pump control operation to be executed under the control of the control unit shown in FIG. 4.

FIG. 6 is a flowchart of the pump control operation to be executed under the control of the control unit 80. The pump control operation will be described in detail below with reference to FIG. 6. As heat cooking operation is started by, for example, operation of the operation panel 11, the pump control operation is also started.

In step S1, based on a detection result by the water level sensor 91 of the auxiliary tank 39, it is decided whether or not the water level in the pot 41 is normal. As a result, if the water level is normal, the processing goes on to step S3. On the other hand, if not normal, i.e., if the water level is lower than a lower-limit value set at a vicinity of the upper side of the steam generator heater 42, then the processing goes on to step S2. At step S2, the pump 35 is kept driven for a predetermined time so that water is supplied from the water tank 30 to the auxiliary tank 39, thereby supplied to the pot 41. At step S3, a count of stop time duration of the pump 35 is reset to a value of '0'. Thereafter, the processing goes on to step S4.

In step S4, for example, based on a detection result by a tank sensor which is placed at a vicinity of the upper side of the steam generator heater 42 in the pot 41 to detect the water temperature, it is decided whether or not the water in the pot 41 is boiling. As a result, if the water is boiling, the processing goes on to step S5; if not, it is awaited that the water boils. In step S5, a counter contained in, for example, the control unit 80 is started, by which the stop time during which the pump 35 is at a stop is counted. In step S6, based on a count value of the counter, it is decided whether or not the stop time of the pump 35 has reached a predetermined time. As a result, if the stop time has reached the predetermined time, the processing goes on to step S7. If not, on the other hand, the processing returns to the step S1, where if the water level in the pot 41 is normal and moreover the water in the pot 41 is boiling, then the counting of the stop time of the pump 35 is continued. When the stop time of the pump 35 reaches the predetermined time, the processing moves to the step S7.

In this connection, the predetermined time refers to a time duration from the time at which the water in the pot 41 starts to boil to the time at which the steam pressure in the closed space formed by the external circulation passage 60, the heating chamber 20 and the pot 41 increases to such a level that the water level in the auxiliary tank 39 no longer changes, the time duration being determined with a ratio P(%) of an output to a maximum output of the steam generator 40 by the following equation:

Predetermined time=$a \times (100/P) + b$, where a and b are factors.
Therefore, assuming that the output P of the steam generator 40 is 100% and the factors are a=50 (sec.) and b=10 (sec.), then the predetermined time is 60 sec. In addition, if an arithmetic program using the above equation is registered in memory, then the predetermined time can be determined by arithmetic operation each time; otherwise, registering in memory predetermined times associated with outputs P and factors 'a' and 'b' in a table form allows a necessary predetermined time to be read out from the memory.

In step S7, the pump 35 is driven for a second predetermined time (e.g., 6 sec.), a small amount of water is supplied from the water tank 30 to the pot 41 via the auxiliary tank 39. It is noted that the second predetermined time is a time duration that allows supply of water in an amount necessary to suppress the water boiling in the pot 41. In step S8, the count of stop time duration of the pump 35 is reset to '0'. In this way, the boiling is suppressed by a small amount of water supplied to the boiling water in the pot 41, so that the water level in the auxiliary tank 39 returns to a normal one, making it possible to correctly detect the water level in the pot 41. Then, from this on, the processing returns to the step S1 to make a decision as to whether or not the water level in the pot 41 is normal.

Thus, in this embodiment, the control unit 80 operates as the water supply control section.

As described above, in this embodiment, the water level sensor 91 is provided in the auxiliary tank 39, which has its bottom portion communicated with the bottom portion of the pot 41 and which is opened to the atmosphere. Then, when the water in the pot 41 keeps boiling and moreover the stop time of the pump 35 reaches a predetermined time (e.g., 60 sec.), the pump 35 is driven only for a second predetermined time (e.g., 6 sec.) to supply water to the pot 41. Accordingly, in the case where the steam pressure in the closed space formed by the external circulation passage 60, the heating chamber 20 and the pot 41 increases so that the water in the auxiliary tank 39, which communicates with the bottom portion of the pot 41, is forced up with a result that the water level in the pot 41 and the water level in the auxiliary tank 39 are different from each other, the boiling of water in the pot 41 is temporarily suppressed, causing the steam pressure in the closed space to lower. As a result, the water level in the auxiliary tank 39 returns to a normal one, making it possible to correctly detect the water level in the pot 41.

Consequently, according to this embodiment, the water level in the pot 41 can be detected correctly at all times.

In this embodiment, a small amount of water is resupplied to the pot 41 when the water in the pot 41 keeps boiling and also the stop time of the pump 35 reaches the predetermined time. However, it is also possible that the resupply of water to the pot 41 may be done when the water in the pot 41 has kept boiling for the predetermined time, regardless of the stop time of the pump 35.

In this embodiment, when heat cooking operation is started by operation of the operation panel 11, the pump is first driven to do water supply unless water is present in the pot 41. However, the present invention is not limited to this. As an alternative, for example, by preparatorily taking measures to disable heat cooking operation unless water is present in the pot 41, it is also possible that when heat cooking operation is started by operation of the operation panel 11, the processing is started from step S4 in the flowchart shown in FIG. 6, subsequently the steps S5-S8 are executed, and thereafter the steps S1-S3 are executed.

In this embodiment, water is supplied to the auxiliary tank 39 by the pump 35. However, water may also be supplied directly to the pot 41.

The foregoing embodiment has been described on a case where the heating cooker 1 includes the steam temperature-raising device 50, in which the object 90 to be cooked is heated by superheated steam derived from the steam temperature-raising device 50. However, needless to say, the invention is applicable also to heating cookers which include no steam temperature-raising device 50 and in which the object to be cooked is heated only by non-superheated steam derived from the steam generator 40.

The invention claimed is:
1. A heating cooker, comprising:
a steam generator for generating steam;
a heating chamber for heating an object to be cooked by steam supplied from the steam generator,
said steam generator including a pot to which water is supplied, a heater placed in the pot, and a water temperature sensor placed in vicinity of an upper side of the heater for outputting a temperature signal that represents a detected temperature,
said heating cooker further comprising:
an auxiliary tank communicating to a bottom portion of the pot and being open to the atmosphere to form a liquid column having a water level equal to a water level of the pot;
a water level sensor provided in the auxiliary tank for detecting the water level in the auxiliary tank;
a pump for supplying water to the pot; and
a water supply control section for, based on a temperature signal derived from the water temperature sensor, detecting a state that the water in the pot is boiling, and, when the boiling state has continued for a predetermined time, controlling the pump to supply to the pot an amount of water necessary to suppress the boiling state.
2. The heating cooker according to claim 1, wherein when a state that the water in the pot is boiling while the pump is at a stop has continued for the predetermined time, the water supply control section controls the pump to supply to the pot an amount of water necessary to suppress the boiling.

3. A heating cooker, comprising:

a water tank;

a steam generator including a pot to which water is supplied from the water tank, a heater placed in the pot, and a water temperature sensor outputting a temperature signal indicating a water temperature within the pot, the steam generator generating steam by evaporating water in the pot;

a heating chamber for heating an object to be cooked by steam supplied from the steam generator, an auxiliary tank connected to the water tank through a pipe and communicating to a bottom portion of the pot, the auxiliary tank being open to the atmosphere to form a liquid column having a water level equal to a water level of the pot;

a water level sensor provided in the auxiliary tank for detecting the water level in the auxiliary tank;

a pump provided on the pipe for supplying water from the water tank to the auxiliary tank; and a water supply control device including a detection part receiving the temperature signal from the water temperature sensor of the steam generator and detecting, based on the temperature signal received, that water in the pot is in a boiling state, and a decision part deciding whether or not the boiling state of the water has continued for a predetermined time, the water supply control device controlling the pump to supply an amount of water necessary to suppress the boiling state from the water tank to the pot through the auxiliary tank when the decision part decides that the boiling state has continued for the predetermined time.

4. The heating cooker according to claim 3, wherein the decision part of the water supply control device decides whether or not the boiling state of the water has continued for the predetermined time by deciding whether the pump has been in a stopped state for the predetermined time after the detection of the boiling state of the water by the detection part.

* * * * *